March 28, 1950  A. T. KULCSAR ET AL  2,502,051
INSIDE CALIPER WITH DIAL AND MICROMETER
Filed Feb. 5, 1947
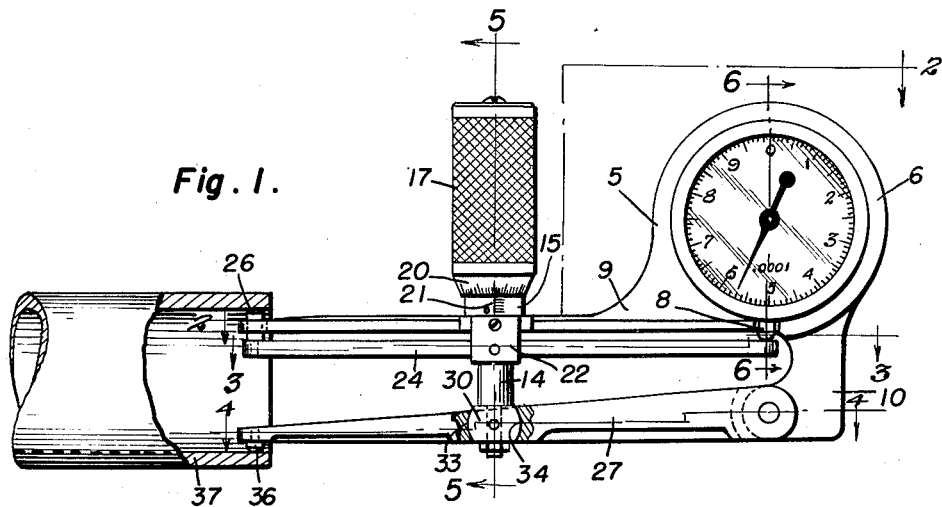
Fig. 1.
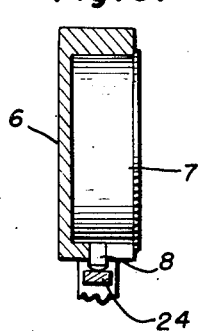
Fig. 5.
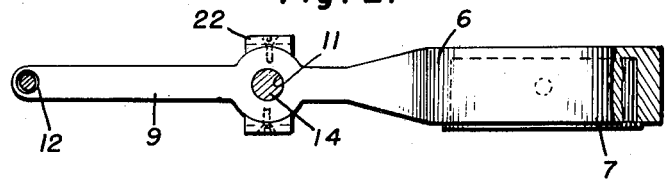
Fig. 2.
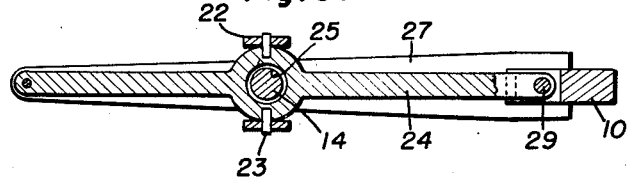
Fig. 3.
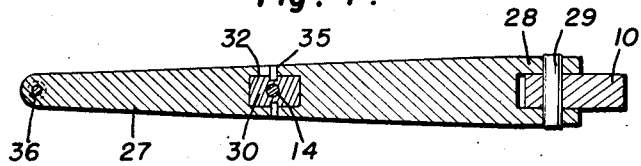
Fig. 4.
Fig. 6.
Inventor
Anton T. Kulcsar
Paul Zelmer
By Clarence A. O'Brien
and Harvey B. Jacobson
Attorneys Patented Mar. 28, 1950

2,502,051

UNITED STATES PATENT OFFICE 2,502,051

INSIDE CALIPER WITH DIAL AND MICROMETER

Anton T. Kulcsar, South Bend, Ind., and Paul Zelmer, Berrien Springs, Mich.

Application February 5, 1947, Serial No. 726,600

5 Claims. (Cl. 33—148)

The present invention relates to new and usefuel improvements in inside calipers and more particularly to a micrometer adjustment for the arms of the caliper and a dial indicator carried by the caliper to register variations in the diameter of the work in accordance with the setting of the caliper.

An important object of the present invention is to provide an improved caliper of this character which is particularly designed for the accurate measurement of small inside diameters and other apertures not easily measured by conventional types of caliper.

A still further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view with parts broken away and shown in section;

Figures 2, 3 and 4 are longitudinal sectional views taken respectively on the lines 2—2, 3—3 and 4—4 of Figure 1;

Figure 5 is a vertical sectional view through the micrometer adjustment for the caliper, and;

Figure 6 is a vertical sectional view through the dial indicator taken on the line 6—6 of Figure 1.

Referring now to the drawings in detail wherein for the purpose of illustration we have disclosed a preferred embodiment of the invention, the numeral 5 designates the body of the caliper which includes a circular housing 6 open at one side and in which is recessed a dial indicator 7 of conventional construction and having a plunger 8 extending downwardly therefrom through the lower portion of the housing.

An upper arm of an inside diameter caliper is shown at 9 which projects horizontally from the lower portion of one side of the housing 6 and a leg 10 extends downwardly from the lower portion of the housing 6 at right angles to the arm 9.

The intermediate portion of the arm 9 is formed with an opening 11 and the outer end portion of the arm is formed with an opening 12.

A micrometer adjusting screw 13 is formed with a smooth lower portion 14 which is slidably mounted in the opening 11 of the arm 9, the screw being threaded through a barrel 15 supported in an upright position on the arm 9 and with the lower end of the barrel threaded in a counterbore 16 for the opening 11 of the arm 9. The screw 13 projects upwardly above the barrel 15 and to which is secured a thimble 17 by means of a screw 18, the thimble telescoping over the barrel as shown in Figure 5 of the drawings.

The lower end of the thimble 17 is beveled as shown at 19 and provided with graduations 20 for operating with vertical graduations 21 on the barrel 15.

A pair of plates 22 are secured to the opposite side of the arm 9 and extend downwardly therefrom and in the lower ends of which inwardly projecting pins 23 are carried for pivotally supporting the opposite side of a lever 24 formed with a central opening 25 through which the smooth portion 14 of the screw 13 freely works.

The lever 24 extends longitudinally under the upper arm 9 and is provided at its outer end with an upwardly projecting gauge point 26 projecting through the opening 12 of the arm 9. The inner end of the lever 24 extends under the plunger 8 in engagement therewith.

A lower arm 27 is bifurcated at its inner end as shown at 28 for pivotally connecting to the leg 10 by means of a pin 29.

To the lower end of the screw 13 is secured a swivel block 30 by means of a nut 31, the sides of the block being flattened as shown at 32 and the ends of the block being rounded as shown at 33, the block being received in a correspondingly shaped opening 34 at the intermediate portion of the lower arm 27. The lower arm 27 is pivoted to the sides of the block 30 by means of inwardly projecting pins 35 carried by the arm.

The outer end of the lower arm 27 is also provided with a gauge point 36 extending downwardly therefrom and cooperating with the gauge point 26 to engage the diametrically opposite side of the bore of the work 37 to function as an inside diameter gauge in the usual manner.

The device is used as an inside diameter gauge by rotating the micrometer thimble 17 which thereby moves the screw 13 vertically through the barrel 15, upper arm 9 and lever 24 and moves the lower arm 27 toward or away from the upper arm to provide a micrometer adjustment of the points 26 and 36 to the exact internal diameter to which the bore of the work 37 is to be machined.

Any deviation in the diameter of the work will cause a fluctuation of the point 26 to rock the lever 24 and register the variation on the dial indicator 7.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What we claim is:

1. A gauge comprising in combination, a fixed arm and a pivoted arm, a lever substantially coextensive in length with the fixed arm pivoted intermediate its ends to the fixed arm to extend alongside the same in laterally spaced relation thereto, said lever and said pivoted arm having laterally extending work contacting points at their outer ends, micrometer adjusting means for the pivoted arm, and a dial indicator carried by the fixed arm and including mechanism operatively engaged by the inner end of the lever to register movements of the lever.

2. A gauge comprising in combination, a fixed arm and a pivoted arm, a lever substantially coextensive in length with the fixed arm pivoted intermediate its ends to the fixed arm to extend alongside the same in laterally spaced relation thereto, said lever and said pivoted arm having laterally extending work contacting points at their outer ends, micrometer adjusting means carried by the fixed arm and connected to the pivoted arm for adjusting the arms relative to each other, and a dial indicator carried by the fixed arm and including mechanism operatively engaged by the inner end of the lever to register movements of the lever.

3. A gauge comprising in combination, a fixed arm and a pivoted arm, a lever substantially coextensive in length with the fixed arm pivoted intermediate its ends to the fixed arm to extend alongside the same in laterally spaced relation thereto, said lever and said pivoted arm having laterally extending work contacting points at their outer ends, micrometer adjusting means carried by the fixed arm and including a screw operated spindle slidable through the fixed arm and connected to the pivoted arm for adjusting the latter relative to the former and a dial indicator carried by the fixed arm and including mechanism operatively engaged by the inner end of the lever to register movements of the lever.

4. A gauge comprising in combination, a fixed arm and a pivoted arm, a lever substantially coextensive in length with the fixed arm pivoted intermediate its ends to the fixed arm to extend alongside the same in laterally spaced relation thereto, said lever and said pivoted arm having laterally extending work contacting points at their outer ends, micrometer adjusting means carried by the fixed arm and including a screw operated spindle slidable through the fixed arm, pivot means connecting the spindle to the pivoted arm for adjusting the pivoted arm toward and away from the fixed arm, and a dial indicator carried by the fixed arm and including mechanism operatively engaged by the inner end of the lever to register movements of the lever.

5. A gauge comprising in combination, a body including a fixed arm having a housing at its upper end, a dial indicator mounted in the housing and including an actuating plunger, a leg projecting from the housing at right angles to the fixed arm, a second arm pivoted at its inner end to the leg, a lever pivoted intermediate its ends to the fixed arm and extending longitudinally thereof, work contacting points at the outer ends of the lever and pivoted arm, the inner end of the lever engaging the plunger of said indicator to register movements of the lever, and micrometer adjusting means carried by the fixed arm and including a spindle pivoted to the pivoted arm to adjust the arms relative to each other.

ANTON T. KULCSAR.
PAUL ZELMER.

REFERENCES CITED

The following references are of record in the file of this patent:

UNITED STATES PATENTS

| Number | Name | Date |
|---|---|---|
| 672,493 | Raus | Apr. 23, 1901 |
| 1,290,434 | Walter | Jan. 7, 1919 |
| 1,459,500 | Cady | June 19, 1923 |
| 1,952,657 | Cecil et al. | Mar. 27, 1934 |

OTHER REFERENCES

American Machinist, pp. 139, 140, Nov. 22, 1945.